United States Patent [19]
Schmitt et al.

[11] 4,430,478
[45] Feb. 7, 1984

[54] THERMOPLASTIC MOLDING MATERIALS

[76] Inventors: Burghard Schmitt, 3 Hermannstrasse, 6520 Worms; Klaus Benker, 52 Fuerstenweg, 6730 Neustadt; Edmund Priebe, 7A Bensheimer Ring, 6710 Frankenthal; Gerhard Lindenschmidt, 11 Buchenweg, 6906 Leimen, all of Fed. Rep. of Germany

[21] Appl. No.: 320,748

[22] Filed: Nov. 12, 1981

[30] Foreign Application Priority Data

Nov. 24, 1980 [DE] Fed. Rep. of Germany ....... 3044110

[51] Int. Cl.$^3$ .................... C08L 51/00; C08L 55/02
[52] U.S. Cl. ........................................ 525/71; 525/80; 525/84; 525/85
[58] Field of Search ................... 525/71, 80, 84, 85

[56] References Cited

U.S. PATENT DOCUMENTS 3,509,237  4/1970  Aubrey .................. 260/876
3,642,947  2/1972  Stein et al. ............. 260/876 R
4,214,056  7/1980  Lavengood ............. 525/71

FOREIGN PATENT DOCUMENTS 1195965  6/1970  United Kingdom .

Primary Examiner—J. Ziegler

[57] ABSTRACT

A thermoplastic molding material which contains two graft copolymers in a matrix of a copolymer based on styrene and acrylonitrile. The first graft copolymer (B) comprising a hard phase prepared from one or more vinyl-aromatic monomers and an elastomer phase, the elastomer phase particles having a diameter of from 0.5 to 5 μm. The second graft copolymer (C) comprising a hard phase and an elastomer phase, said elastomer phase having a bimodal particle distribution in which the diameter of one category of particles is from 0.05 to 0.18 μm and the second category of particles has a mean diameter of from 0.25 to 0.6 μm.

9 Claims, No Drawings

THERMOPLASTIC MOLDING MATERIALS

The present invention relates to a thermoplastic molding material which contains two graft copolymers in a matrix of, preferably, a copolymer based on styrene and acrylonitrile, one of the graft copolymers preferably having been prepared in solution and the other in emulsion.

Thermoplastic molding materials which contain a copolymer as the matrix, together with two different graft copolymers, have already been disclosed in (1) U.S. Pat. No. 3,509,237, (2) British Pat. No. 1,195,965 and (3) U.S. Pat. No. 3,642,947.

The molding materials known from (1), (2) or (3) have a pattern of properties which overall is not entirely satisfactory, especially in respect of the impact strength, notched impact strength and breaking energy at −40° C., the flow, the heat distortion resistance and the surface characteristics.

It is an object of the invention to provide molding materials which have an overall pattern of properties better than that of the prior art products, in that some, and in many cases all, of the above properties show improvements compared to those of the conventional materials.

We have found that this object is achieved by thermoplastic molding materials according to claim 1 or 2, and that these materials have a substantially improved overall pattern of properties.

The measures recited in the sub-claims permit advantageous further development and improvement of the molding materials specified in the main claim. The improvement in surface properties (greater gloss tolerance) is revealed particularly clearly by the fact that even moldings produced by injection-molding at above 220°–240° C. still show surface gloss.

The copolymer A is based on monomers which form polymerize to form a hard phase. The copolymer can be prepared in a conventional manner by polymerizing from 80 to 60% by weight, especially from 75 to 65% by weight, of a vinyl-aromatic monomer and from 20 to 40, especially from 25 to 35, % by weight of an ethylenically unsaturated monomer, such as acrylonitrile, or from 20 to 55% by weight of methyl methacrylate, the lower limit in the latter case being 45% by weight. Suitable vinyl-aromatic monomers $a_1$ are styrene and/or alkylstyrenes, especially α-methylstyrene; the latter is employed principally if the molding material is to have a high heat distortion resistance. In that case, mixtures of styrene and acrylonitrile with up to 30% by weight of α-methylstyrene, based on the total monomer mixtures, are usually employed. Preferred copolymers A contain from 25 to 35% by weight of acrylonitrile and from 75 to 65% by weight of styrene as copolymerized units. These copolymers are commercially available and can be prepared, for example, as described in German Published Application DAS No. 1,001,001 or German Patent No. 1,003,436. The molecular weight (weight-average $\overline{M}_w$, measured by light scattering) of the copolymer A ranges from 80,000 to 250,000.

The molding material according to the invention contains from 5 to 80, preferably from 10 to 50, % by weight, based on A+B+C, of the copolymer A, which constitutes the matrix for the graft copolymers B and C described below.

Graft copolymer B is preferably prepared in solution. It comprises two phases, a hard phase (ba), prepared from one or more vinyl-aromatic monomers (bc) and one or more ethylenically unsaturated monomers (bd), and an elastomer phase (bb). The latter consists of an elastomeric polymer or copolymer which is essentially prepared from an aliphatic diene (be) of 4 or 5 carbon atoms or a mixture of such dienes. The copolymer can alternatively contain from 60 to 85% by weight of diene and from 15 to 40% by weight of a vinyl-aromatic monomer, especially styrene, an ethylenically unsaturated monomer, especially acrylonitrile, or as copolymerized units. The copolymerized monomers are referred to as (bc) and (bd) in the claim. Polybutadienes with cis-contents of from 30 to 40 and 1,2-vinyl contents of from 7 to 14 are preferred. Amongst the copolymers, block copolymers of styrene and butadiene are particularly preferred. Mixtures of polybutadiene rubbers and styrene-butadiene block copolymer rubbers can also be used. It is essential that the elastomer phase (bb) of the graft copolymer B should have a particle diameter of from 0.5 to 5 micrometers, especially of from 0.9 to 2.1 μm. All the particle diameters referred to are number-average values.

The elastomer phase (bb) of the graft copolymer B as well as the corresponding phase (cb) of the graft copolymer C, and the elastomer phase in the final molding material, can be rendered discernible by electron microphotographs, using special techniques such as osmium tetroxide contrasting.

Preferred vinyl-aromatic monomers (bc) for the synthesis of the graft copolymer B are essentially styrene alone or a mixture of styrene and α-methylstyrene, the latter especially in order to obtain molding materials having good heat distortion resistance. The vinyl-aromatic monomers are preferably used together with the ethylenically unsaturated monomers (bd), namely acrylonitrile or methyl methacrylate. If the hard phase (ba) of the graft copolymer B is principally synthesized from acrylonitrile and styrene, mixtures of from 22 to 29% by weight of acrylonitrile and from 78 to 71% by weight of styrene are employed. If the hard phase is synthesized from acrylonitrile, styrene and α-methylstyrene, from 32 to 28% by weight of the monomers (bd) and from 68 to 72% by weight of the monomers (bc) are employed in the mixture.

If the hard phase of the graft copolymer B is synthesized only from styrene and methyl methacrylate, the weight ratio of the former to the latter is from 80:20 to 45:55.

Accordingly, the monomer mixture for the preparation of the graft copolymer B can contain from 80 to 45% by weight of the vinyl-aromatic monomer (bc) and from 20 to 55% by weight of the ethylenically unsaturated monomer (bd). The mixture can be varied—in accordance with the requirements to which the molding material has to conform—within the stated ranges, in order to give molding materials which are more or less resistant to heat distortion or, if the proportion of units (bd) is near the upper limits of the stated ranges, to give molding materials which are more resistant to chemicals. The graft copolymer B is preferably prepared by reacting 100 parts by weight of a mixture of the monomers (bc+bd) which form a hard polymer in the presence of from 10 to 20 parts by weight of an elastomeric polymer or copolymer dissolved therein and serving as the grafting base. The graft copolymerization can be carried out in the presence of inert solvents; for example, from 5 to 30% by weight, based on the total solution, of an alkyl-aromatic, especially ethylbenzene, can be used. Preferably, the graft copolymer B is prepared as described in German Laid-Open Application DOS No. 1,495,089. The graft copolymerization of styrene and acrylonitrile can be carried out in the presence of butadiene polymers having intrinsic viscosities of from 60 to 200 ml/g and containing 85% or more of 1,4-structure, with more than 30% of cis-configuration. If block copolymers of butadiene and styrene, especially block copolymers prepared by anionic polymerization with lithium-organic initiators, or mixtures of polybutadiene with certain proportions of block copolymers, are used as the elastomer phase, in principle the same preparation conditions are employed. The graft copolymerization is advantageously carried out in a plurality of stages, at from 60° to 170° C., preferably from 100° to 160° C., and can be started in a conventional manner, either thermally or by means of initiators. The conventional additives, namely regulators such as dodecyl mercaptan, stabilizers and lubricants, can be present in the polymerization mixture; such additives, and the effective amounts to use, are familiar to a skilled worker. In carrying out the graft polymerization, the conditions must be chosen to ensure that from 10 to 50% by weight of the monomers (bc) and (bd) which form the hard phase (ba) are grafted onto the grafting base (bb), the said percentage being based on the sum of the monomers which form the elastomer phase, namely (be) or (bc) plus (be), or (be) plus (bd). If less than 10% by weight of the monomers (bc) plus (bd) are grafted onto the base, the impact strength of the molding materials and their surface gloss are adversely affected because the elastomer particles formed are too large (diameter of the particles of the elastomer phase greater than 5 μm). If more than 40% by weight are grafted onto the base, the structure of the elastomer phase is changed, with the particle dimensions also frequently being smaller again, and the impact strength being lower. A degree of grafting of from 15 to 30% by weight is particularly preferred.

The graft copolymer C employed is an emulsion graft copolymer which comprises (ca) a hard phase as the grafting chains and (cb) an elastomer phase as the grafting base. The hard phase of the emulsion graft copolymer essentially contains one or more vinyl-aromatic monomers and one or more ethylenically unsaturated monomers. Suitable ethylenically unsaturated monomers are, in particular, acrylonitrile, methyl methacrylate and mixtures of these two monomers. The preferred vinyl-aromatic monomer is styrene, but mixtures of styrene with α-methylstyrene can also be used, though these are not preferred. The elastomer phase (cb) is a copolymer which is essentially synthesized from an aliphatic diene of 4 or 5 carbon atoms and may additionally contain small amounts of an alkyl acrylate, alkyl being of 2 to 8 carbon atoms, or which is predominantly synthesized of one or more alkyl acrylates, alkyl being of 2 to 8 carbon atoms. Using only aliphatic dienes as the monomers in the grafting base has a favorable effect on the low temperature impact strength and on the surface gloss of the molded materials. Using predominantly an alkyl acrylate in the grafting base ensures good aging resistance and weathering resistance, as well as good resistance to discoloration and to heat exposure during thermoplastic processing.

The graft copolymer C is prepared in a conventional manner by graft copolymerization of from 20 to 60 parts by weight of a monomer mixture comprising one or more vinyl-aromatic monomers (cc) and one or more ethylenically unsaturated monomers (cd) in an aqueous emulsion and 100 parts by weight of an elastomeric polymer (ce). The preferred vinyl-aromatic monomer is styrene, which may be mixed with α-methylstyrene, though such mixtures are not preferred. Suitable ethylenically unsaturated monomers are in particular acrylonitrile and methyl methacrylate. The elastomeric polymer which forms the grafting base may be synthesized from an aliphatic diene of 4 or 5 carbon atoms. A polybutadiene emulsion polymer containing from 20 to 30% of 1,4-cis units, from 18 to 25% of 1,2-vinyl units and about 55% of 1,4-trans units is particularly preferred.

However, instead of being based on a diene, the elastomeric polymer can also be based on a monomer of an alkyl acrylate, where alkyl is of 2 to 8 carbon atoms, butyl acrylate and 2-ethylhexyl acrylate being particularly preferred. Moreover, copolymers of acrylic esters with up to 60% by weight of butadiene may also be used, as may, in particular, a terpolymer of from 30 to 77% by weight of butyl acrylate, from 20 to 40% by weight of butadiene and from 3 to 20% by weight of vinylalkyl ethers, where alkyl is of 1 to 4 carbon atoms. The weight ratio of the monomers (cc) to monomers (cd) in the grafting chains can be from 45:55 (if methyl methacrylate is used), or from 60:40 (if acrylonitrile is used) to 90:10. The graft polymerization is carried out by adding a mixture of the monomers (cc) and (cd), forming the graft chains, in the above weight ratio, to an aqueous emulsion of the polybutadiene, or acryllic ester polymer, or butadiene/acrylic ester copolymer, or the terpolymer described. Additional emulsifier can be added during grafting. The polymerization is started by free radical initiators, such as azo compounds or peroxides. The polymerization temperature can be from 50° to 100° C. Conventional additives, such as regulators and stabilizers, can be present when the polymerization is carried out.

It is essential, in order to achieve a balanced pattern of properties of the thermoplastic molding material, that the elastomer phase (cb) from which the graft copolymer C is derived contains particles of two different mean sizes.

One of these categories consists of particles $(cb_1)$ of diameter from 0.05 to 0.18 μm, preferably from 0.08 to 0.15 μm.

The elastomer phase of the graft copolymer C must moreover contain a second phase with particles of mean diameter from 0.25 to 0.6 μm, preferably from 0.35 to 0.50 μm. Again, these figures relate to the number-average particle size.

The proportion of the elastomer phase $(cb_1)$ in the molding material should be less than 60% by weight, preferably less than 30% by weight, of the sum of all elastomer phases jointly present in the graft copolymer B+C.

If the proportion of the small-particle elastomer phase $(cb_1)$ exceeds 60% by weight of the total elastomer phase the impact strength, in particular the notched impact strength according to DIN 53,453, decreases substantially. At the same time, high proportions of the small-particle elastomer phase reduce the flow and low temperature impact strength, and render the mechanical properties dependent on the processing temperature. The latter phenomenon is due to the tendency of small elastomer particles to form clusters in the molten copolymer during thermoplastic processing.

If the small elastomer particles are present in very low proportions (<10% by weight) or are completely absent, the breaking energy under biaxial stress (falling tube test) drops dramatically. At the same time, the heat distortion resistance diminishes, and the shrinkage increases, because of greater orientation occurring during thermoplastic processing.

In the thermoplastic molding material according to the invention, the weight ratio of elastomer phase ($cb_1$) to elastomer phase ($cb_2$) of the graft copolymer C should be from 80:20 to 20:80.

Weight ratios of ($cb_1$) to ($cb_2$) greater than 4 result in the disadvantages described above for the case of excessively high proportions of the small-particle elastomer phase.

If, on the other hand, the weight ratio of ($cb_1$) to ($cb_2$) is less than 1:4, the stability of the dispersions when carrying out the graft polymerization presents difficulties.

The joint proportion of the two graft copolymers B+C in the molding material according to the invention, comprising A+B+C, should be from 20 to 95% by weight. Below the lower limit of 20% by weight, the effect of the reinforcing rubber rapidly diminishes and the materials become stiff and brittle. Above a value of 95% by weight, on the other hand, the elastomeric character becomes ever more pronounced, the rigidity and flow drop dramatically and thermoplastic processing becomes ever more difficult.

Conventional methods are used to ensure that the particle size ranges of from 0.05 to 0.18 $\mu$m (for $cb_1$) and from 0.25 to 0.6 $\mu$m (for $cb_2$) of the elastomer phase (cb) of the graft copolymer C are obtained. Various methods for this purpose are listed in German Published Application DAS No. 2,497,960, and reference may be made to these as representative of the comprehensive prior art. The agglomeration process described in the said DAS is a particularly preferred way of obtaining the bimodal distribution of the elastomer phase of the graft copolymer C. In this known method, an emulsion polymer of the elastomer phase (cb) is first prepared in a conventional manner. A certain proportion of this emulsion polymer is then converted, by means of the agglomeration process, to a particle size range of from 0.25 to 0.6 $\mu$m, so that the proportion of the elastomer phase ($cb_1$), with particle sizes of from 0.08 to 0.15 $\mu$m, is less than 60% by weight, based on the sum of the elastomer phases ($cb_1$), ($cb_2$) and (bb), whilst the ratio of ($cb_1$) to ($cb_2$) remains from 4:1 to 1:4. Following the agglomeration, grafting can then be carried out, in one step, onto both the non-agglomerated particles and the particles which have been enlarged by agglomeration. In the conventional process, grafting in emulsion can be carried out without difficulties even at high solids contents. This is a particular advantage of the agglomeration process of the above DAS over the process of acetic acid agglomeration and of other conventional methods of making the particles larger, for example by shearing or freeze-drying. It is also possible to produce the bimodal distribution of the elastomer phase particles of the graft copolymer C by means of the seeding latex process. However, this method is more time-consuming, since it requires the additional preparation of a seeding latex and, thereafter, of enlarged particles, and the polymerization of butadiene onto a seeding latex, to prepare larger particles, demands very long reaction times.

The molding materials according to the invention may or may not contain other additives D. Examples of these are fillers, pigments, stabilizers, antioxidants, lubricants and slip agents. These materials are faimilar to a skilled worker and can be added in the conventional effective amounts.

To prepare the novel molding material, the components A, B and C are mixed at from 220° to 300° C. on conventional processing machinery, such as extruders, rolls or kneaders, if desired by directly feeding-in the aqueous dispersion of the graft rubber component C and at the same time effecting its drying. The additives mentioned above can be added at the stage of preparation of this mixture or subsequently.

The copolymers A and graft copolymers B and C listed in Tables 1, 2 and 3 which follow were used for the preparation of molding materials according to the present invention, or for comparative purposes.

The properties and characteristic data referred to in the description and the Examples were determined by the following methods:

1. The (number-average) particle diameter of the elastomer particles was determined by counting of electron microphotographs.

2. The notched impact strength $a_{k1}$ was determined according to DIN 53,453 on injection-molded standard small bars at various temperatures (namely room temperature 20° C., $-20°$ C. and $-40°$ C.).

3. The breaking energy was determined by a biaxial perforation test (falling ball test, FBT, DIN 53,443) on circular disks of size 60×2 mm obtained by injection-molding at 250° C.

4. The surface gloss or gloss range was determined by measuring the reflectance of visible light from the surface of injection-molded plaques in comparison to a white blotting paper as the standard (rated at 0% reflection). To assess the gloss range, the injection temperature, mold temperature and injection time were varied. The conditions are coded as follows:

KT 1
Temperature of the plastic: 280° C.
Mold temperature: 60° C.
Injection time: 0.4 sec.

KT 2
Temperature of the plastic: 220° C.
Mold temperature: 30° C.
Injection time: 2.0 sec.

5. The flow was determined as the melt index, MFI 200° C./21.6 kp, in grams/10 minutes (according to DIN 53,735).

6. The heat distortion resistance was determined as a Vicat temperature in °C. (DIN 53,460).

7. The mean molecular weight, $\overline{M}_w$, was determined by light scattering.

The Examples and comparative experiments which follow illustrate the invention. The parts and percentages in the Examples are by weight, unless stated otherwise.

EXAMPLES 1 to 72 and COMPARATIVE EXPERIMENTS 1 to 4

Table 4 shows the results of measurements on molding materials according to the present invention; these constitute Examples 1 to 72, which are compared with results on materials prior art. The comparison shows that novel molding materials according to this invention are superior to those prepared using prior art materials.

TABLE 1

Copolymers A

Composition in % by weight

| Code | Styrene | α-Methyl-styrene | Acrylo-nitrile | Methyl-meth-acrylate | Molecular weight $M_w$ |
|---|---|---|---|---|---|
| $A_{11}$ | 80 | — | 20 | — | 220,000 |
| $A_{12}$ | 75 | — | 25 | — | 150,000 |
| $A_{13}$ | 65 | — | 35 | — | 92,000 |
| $A_{21}$ | 95 | — | — | 5 | 350,000 |
| $A_{22}$ | 80 | — | — | 20 | 320,000 |
| $A_{23}$ | 75 | — | — | 25 | 360,000 |
| $A_{24}$ | 45 | — | — | 55 | 300,000 |
| $A_{31}$ | 45 | 30 | 25 | — | 155,000 |
| $A_{32}$ | 40 | 30 | 30 | — | 127,000 |

TABLE 2

Graft copolymers B

| | Composition of the graft copolymer | | | Elastomer phase Composition | | Mean diameter μm | Proportion of elastomer phase |
|---|---|---|---|---|---|---|---|
| Code | Styrene | Acrylo-nitrile | Buta-diene | Styrene | Buta-diene | | |
| $B_{11}$ | 62 | 23 | 15 | — | 100 | 2.1 | 15 |
| $B_{21}$ | 66.6 | 19.4 | 14 | 30 | 70 | 0.9 | 20 |

TABLE 3

Graft copolymers C

| | Composition of the hard phase (grafting shell) | | Composition of the elastomer phase | | | Degree of grafting | Diameter | |
|---|---|---|---|---|---|---|---|---|
| Code | Styrene | Acrylo-nitrile | Buta-diene | Butyl-acrylate | Ethyl-hexyl acrylate | | Small μm | Large μm |
| $C_{11}$ | 70 | 30 | 100 | — | — | 40 | 0.11 | 0.38 |
| $C_{12}$ | 70 | 30 | 40 | 60 | — | 35 | 0.11 | 0.35 |
| $C_{13}$ | 70 | 30 | — | 100 | — | 30 | 0.09 | 0.45 |
| $C_{14}$ | 70 | 30 | — | — | 100 | 30 | 0.08 | 0.47 |
| $C_{21}$ | 75 | 25 | 100 | — | — | 40 | 0.11 | 0.38 |
| $C_{22}$ | 75 | 25 | 40 | 60 | — | 35 | 0.11 | 0.35 |
| $C_{23}$ | 75 | 25 | — | 100 | — | 30 | 0.09 | 0.45 |
| $C_{24}$ | 75 | 25 | — | — | 100 | 30 | 0.08 | 0.47 |
| $C_{31}$ | 80 | 20 | 100 | — | — | 40 | 0.11 | 0.38 |
| $C_{32}$ | 80 | 20 | 40 | 60 | — | 35 | 0.11 | 0.35 |
| $C_{33}$ | 80 | 20 | — | 100 | — | 30 | 0.09 | 0.45 |
| $C_{34}$ | 80 | 20 | — | — | 100 | 30 | 0.08 | 0.47 |

TABLE 4

| Example No. | Nature and proportion of the components | | | | | | Proportion in total product % | Elastomer phase Composition [parts] | | | Ratio $cb_1:cb_2$ |
|---|---|---|---|---|---|---|---|---|---|---|---|
| | A [parts] | | B [parts] | | C [parts] | | | $cb_1$ | $cb_2$ | bb | |
| 1 | 5 | $A_{11}$ | 73.3 | $B_{11}$ | 21.7 | $C_{11}$ | 24 | 10.8 | 43.4 | 45.8 | 20/80 |
| 2 | 5 | $A_{12}$ | 73.3 | $B_{11}$ | 21.7 | $C_{11}$ | 24 | 10.8 | 43.4 | 45.8 | 20/80 |
| 3 | 5 | $A_{13}$ | 73.3 | $B_{11}$ | 21.7 | $C_{11}$ | 24 | 10.8 | 43.4 | 45.8 | 20/80 |
| 4 | 20 | $A_{13}$ | 53.3 | $B_{11}$ | 26.7 | $C_{11}$ | 24 | 13.3 | 53.4 | 33.3 | 20/80 |
| 5 | 40 | $A_{13}$ | 26.7 | $B_{11}$ | 33.3 | $C_{11}$ | 24 | 16.7 | 66.7 | 16.7 | 20/80 |
| 6 | 16.6 | $A_{13}$ | 66.7 | $B_{11}$ | 16.7 | $C_{11}$ | 20 | 10.0 | 40.0 | 50.0 | 20/80 |
| 16 | 20 | $A_{24}$ | 53.8 | $B_{11}$ | 26.7 | $C_{11}$ | 24 | 13.3 | 53.4 | 33.3 | 20/80 |
| 17 | 20 | $A_{31}$ | 53.8 | $B_{11}$ | 26.7 | $C_{11}$ | 24 | 13.3 | 53.4 | 33.3 | 20/80 |
| 18 | 20 | $A_{33}$ | 53.8 | $B_{11}$ | 26.7 | $C_{11}$ | 24 | 13.3 | 53.4 | 33.3 | 20/80 |
| 19 | 6.7 | $A_{11}$ | 73.3 | $B_{11}$ | 20.0 | $C_{12}$ | 24 | 10.8 | 43.4 | 45.8 | 20/80 |
| 20 | 6.7 | $A_{12}$ | 73.3 | $B_{11}$ | 20.0 | $C_{12}$ | 24 | 10.8 | 43.4 | 45.8 | 20/80 |
| 21 | 6.7 | $A_{13}$ | 73.3 | $B_{11}$ | 20.0 | $C_{12}$ | 24 | 10.8 | 43.4 | 45.8 | 20/80 |
| 22 | 22.1 | $A_{13}$ | 53.3 | $B_{11}$ | 24.6 | $C_{12}$ | 24 | 13.3 | 53.4 | 33.3 | 20/80 |
| 23 | 42.5 | $A_{13}$ | 26.7 | $B_{11}$ | 30.8 | $C_{12}$ | 24 | 16.7 | 66.7 | 16.7 | 20/80 |
| 24 | 17.9 | $A_{13}$ | 66.7 | $B_{11}$ | 15.4 | $C_{12}$ | 20 | 10.0 | 40.0 | 50.0 | 20/80 |
| 25 | 27.7 | $A_{13}$ | 53.8 | $B_{11}$ | 18.5 | $C_{12}$ | 20 | 12.0 | 48.0 | 40.0 | 20/80 |
| 26 | 48.7 | $A_{13}$ | 26.7 | $B_{11}$ | 24.6 | $C_{12}$ | 20 | 16.0 | 64.0 | 20.0 | 20/80 |
| 27 | 25.0 | $A_{13}$ | 55.0 | $A_{21}$ | 20.0 | $C_{12}$ | 24 | 10.8 | 43.4 | 45.8 | 20/80 |
| 28 | 6.7 | $A_{13}$ | 73.3 | $B_{11}$ | 20.0 | $C_{22}$ | 24 | 10.8 | 43.4 | 45.8 | 20/80 |
| 29 | 6.7 | $A_{13}$ | 73.3 | $B_{11}$ | 20.0 | $C_{32}$ | 24 | 10.8 | 43.4 | 45.8 | 20/80 |
| 30 | 8.2 | $A_{13}$ | 63.3 | $B_{11}$ | 28.5 | $C_{12}$ | 28 | 13.2 | 52.9 | 33.9 | 20/80 |
| 31 | 22.1 | $A_{21}$ | 53.8 | $B_{11}$ | 24.6 | $C_{12}$ | 24 | 13.3 | 53.4 | 33.3 | 20/80 |
| 32 | 22.1 | $A_{22}$ | 53.8 | $B_{11}$ | 24.6 | $C_{12}$ | 24 | 13.3 | 53.4 | 33.3 | 20/80 |
| 33 | 22.1 | $A_{23}$ | 53.8 | $B_{11}$ | 24.6 | $C_{12}$ | 24 | 13.3 | 53.4 | 33.3 | 20/80 |
| 34 | 22.1 | $A_{24}$ | 53.8 | $B_{11}$ | 24.6 | $C_{12}$ | 24 | 13.3 | 53.4 | 33.3 | 20/80 |
| 35 | 22.1 | $A_{31}$ | 53.8 | $B_{11}$ | 24.6 | $C_{12}$ | 24 | 13.3 | 53.4 | 33.3 | 20/80 |
| 36 | 22.1 | $A_{32}$ | 53.8 | $B_{11}$ | 24.6 | $C_{12}$ | 24 | 13.33 | 53.4 | 33.3 | 20/80 |
| 37 | 8.1 | $A_{11}$ | 73.3 | $B_{11}$ | 18.6 | $C_{13}$ | 24 | 19.0 | 35.2 | 45.8 | 35/65 |
| 38 | 8.1 | $A_{12}$ | 73.3 | $B_{11}$ | 18.6 | $C_{13}$ | 24 | 19.0 | 35.2 | 45.8 | 35/65 |
| 39 | 8.1 | $A_{13}$ | 73.3 | $B_{11}$ | 18.6 | $C_{13}$ | 24 | 19.0 | 35.2 | 45.8 | 35/65 |
| 40 | 23.3 | $A_{13}$ | 53.3 | $B_{11}$ | 22.9 | $C_{13}$ | 24 | 23.3 | 43.4 | 33.3 | 35/65 |
| 41 | 44.7 | $A_{13}$ | 26.7 | $B_{11}$ | 28.6 | $C_{13}$ | 24 | 29.2 | 54.1 | 16.7 | 35/65 |
| 42 | 19.0 | $A_{13}$ | 16.7 | $B_{11}$ | 13.3 | $C_{13}$ | 20 | 17.5 | 32.5 | 50.0 | 35/65 |
| 43 | 29.1 | $A_{13}$ | 53.8 | $B_{11}$ | 17.1 | $C_{13}$ | 20 | 21.0 | 29.0 | 40.0 | 35/65 |
| 44 | 50.4 | $A_{13}$ | 26.7 | $B_{11}$ | 22.9 | $C_{13}$ | 20 | 28.0 | 52.0 | 20.0 | 35/65 |

TABLE 4-continued

| | | | | | | | | | |
|---|---|---|---|---|---|---|---|---|---|
| 45 | 26.4 | $A_{13}$ | 55.0 $B_{21}$ | 18.6 $C_{13}$ | 24 | 19.0 | 35.2 | 45.8 | 35/65 |
| 46 | 8.1 | $A_{13}$ | 73.3 $B_{11}$ | 18.6 $C_{23}$ | 24 | 19.0 | 35.2 | 45.8 | 35/65 |
| 47 | 8.1 | $A_{13}$ | 73.3 $B_{11}$ | 18.6 $C_{33}$ | 24 | 19.0 | 35.2 | 45.8 | 35/65 |
| 48 | 10.3 | $A_{13}$ | 63.3 $B_{11}$ | 26.4 $C_{13}$ | 28 | 23.1 | 43.0 | 33.9 | 35/65 |
| 49 | 23.3 | $A_{21}$ | 53.8 $B_{11}$ | 22.9 $C_{13}$ | 24 | 23.3 | 43.4 | 33.3 | 35/65 |
| 50 | 23.3 | $A_{22}$ | 53.8 $B_{11}$ | 22.9 $C_{13}$ | 24 | 23.3 | 32.4 | 33.3 | 35/65 |
| 51 | 23.3 | $A_{23}$ | 53.8 $B_{11}$ | 22.9 $C_{13}$ | 24 | 23.3 | 43.4 | 33.3 | 35/65 |
| 52 | 23.3 | $A_{24}$ | 53.8 $B_{11}$ | 22.9 $C_{13}$ | 24 | 23.3 | 43.4 | 33.3 | 35/65 |
| 53 | 23.3 | $A_{31}$ | 53.8 $B_{11}$ | 22.9 $C_{13}$ | 24 | 23.3 | 43.4 | 33.3 | 35/65 |
| 54 | 23.3 | $A_{32}$ | 53.8 $B_{11}$ | 22.9 $C_{13}$ | 24 | 23.3 | 43.4 | 33.3 | 35/65 |
| 55 | 8.1 | $A_{11}$ | 73.3 $B_{11}$ | 18.6 $C_{14}$ | 24 | 19.0 | 35.2 | 45.8 | 35/65 |
| 56 | 8.1 | $A_{12}$ | 73.3 $B_{11}$ | 18.6 $C_{14}$ | 24 | 19.0 | 35.2 | 45.8 | 35/65 |
| 57 | 8.1 | $A_{13}$ | 73.3 $B_{11}$ | 18.6 $C_{14}$ | 24 | 19.0 | 35.2 | 45.8 | 35/65 |
| 58 | 23.3 | $A_{13}$ | 53.3 $B_{11}$ | 22.9 $C_{14}$ | 24 | 23.3 | 43.4 | 33.3 | 35/65 |
| 59 | 44.7 | $A_{13}$ | 26.7 $B_{11}$ | 28.6 $C_{14}$ | 24 | 29.2 | 54.1 | 16.7 | 35/65 |
| 60 | 19.0 | $A_{13}$ | 66.7 $B_{11}$ | 14.3 $C_{14}$ | 20 | 17.5 | 32.5 | 50.0 | 35/65 |
| 61 | 29.1 | $A_{13}$ | 53.8 $B_{11}$ | 17.1 $C_{14}$ | 20 | 21.0 | 39.0 | 40.0 | 35/65 |
| 62 | 50.4 | $A_{13}$ | 26.7 $B_{11}$ | 22.9 $C_{14}$ | 20 | 28.0 | 52.0 | 20.0 | 35/65 |
| 63 | 26.4 | $A_{13}$ | 55.0 $B_{21}$ | 18.6 $C_{14}$ | 24 | 19.0 | 35.2 | 45.8 | 35/65 |
| 64 | 8.1 | $A_{13}$ | 73.3 $B_{11}$ | 18.6 $C_{24}$ | 24 | 19.0 | 35.2 | 45.8 | 35/65 |
| 65 | 8.1 | $A_{13}$ | 73.3 $B_{11}$ | 18.6 $C_{24}$ | 24 | 19.0 | 35.2 | 45.8 | 35/65 |
| 66 | 10.3 | $A_{13}$ | 63.3 $B_{11}$ | 26.4 $C_{14}$ | 28 | 23.1 | 43.0 | 33.9 | 35/65 |
| 67 | 23.3 | $A_{21}$ | 53.8 $B_{11}$ | 22.9 $C_{14}$ | 24 | 23.3 | 43.4 | 33.3 | 35/65 |
| 68 | 23.3 | $A_{21}$ | 53.8 $B_{11}$ | 22.9 $C_{14}$ | 24 | 23.3 | 43.4 | 33.3 | 35/65 |
| 69 | 23.3 | $A_{22}$ | 53.8 $B_{11}$ | 22.9 $C_{14}$ | 24 | 23.3 | 43.4 | 33.3 | 35/65 |
| 70 | 23.3 | $A_{24}$ | 53.8 $B_{11}$ | 22.9 $C_{14}$ | 24 | 23.3 | 43.4 | 33.3 | 35/65 |
| 71 | 23.3 | $A_{31}$ | 53.8 $B_{11}$ | 22.9 $C_{14}$ | 24 | 23.3 | 43.4 | 33.3 | 35/65 |
| 72 | 23.3 | $A_{32}$ | 53.8 $B_{11}$ | 22.9 $C_{14}$ | 24 | 23.3 | 43.4 | 33.3 | 35/65 |

Comparative experiment

| | | | | | | | | | |
|---|---|---|---|---|---|---|---|---|---|
| 1 | 5.0 | $A_{13}$ | 73.3 $B_{11}$ | 21.7 $C_{11}$ | 24 | 51.5 | 2.7 | 45.8 | 95/5 |
| 2 | 6.7 | $A_{13}$ | 73.3 $B_{11}$ | 20.0 $C_{12}$ | 24 | 51.5 | 2.7 | 45.8 | 95/5 |
| 3 | 8.1 | $A_{13}$ | 73.3 $B_{11}$ | 18.6 $C_{13}$ | 24 | 51.5 | 2.7 | 45.8 | 95/5 |
| 4 | 8.1 | $A_{13}$ | 73.3 $B_{11}$ | 18.6 $C_{13}$ | 24 | 51.5 | 2.7 | 45.8 | 95/5 |

| Example No. | Mechanical properties | | | | | | | Vicat temp. °C. | Reflectance | |
|---|---|---|---|---|---|---|---|---|---|---|
| | $a_{kl}$ [kJ/m$^2$] | | | FBT [Nm] | | | | | KT 1 | KT 2 |
| | 20° C. | −20° C. | −40° C. | 20° C. | −20° C. | −40° C. | MFI | | % | % |
| 1 | 20 | 15 | 10 | 24 | 17 | 18 | 4.8 | 92.5 | 46 | 11 |
| 2 | 20 | 14 | 12 | 24 | 19 | 18 | 6.0 | 93.0 | 46 | 11 |
| 3 | 21 | 15 | 13 | 23 | 21 | 19 | 5.0 | 93.0 | 46 | 11 |
| 4 | 19 | 11 | 10 | 25 | 22 | 18 | 5.1 | 95.0 | 42 | 10 |
| 5 | 19 | 11 | 11 | 27 | 22 | 20 | 4.6 | 95.5 | 44 | 12 |
| 6 | 18 | 12 | 10 | 25 | 17 | 13 | 8.6 | 96.0 | 43 | 9 |
| 7 | 18 | 14 | 9 | 26 | 16 | 11 | 11.0 | 96.5 | 46 | 8 |
| 8 | 19 | 12 | 90 | 27 | 14 | 8 | 12.3 | 95.0 | 44 | 9 |
| 9 | 21 | 14 | 14 | 25 | 21 | 20 | 6.5 | 94.5 | 39 | 8 |
| 10 | 22 | 15 | 13 | 26 | 20 | 18 | 4.9 | 94.0 | 46 | 10 |
| 11 | 20 | 14 | 13 | 25 | 19 | 18 | 4.7 | 95.0 | 45 | 11 |
| 12 | 21 | 16 | 15 | 30 | 21 | 21 | 3.7 | 87.0 | 40 | 6 |
| 13 | 16 | 12 | 9 | 21 | 15 | 14 | 5.6 | 91.0 | 45 | 10 |
| 14 | 16 | 10 | 8 | 19 | 14 | 14 | 6.0 | 92.0 | 45 | 10 |
| 15 | 14 | 10 | 7 | 20 | 13 | 11 | 7.4 | 94.0 | 44 | 11 |
| 16 | 13 | 8 | 7 | 18 | 12 | 11 | 7.0 | 92.0 | 43 | 10 |
| 17 | 20 | 14 | 12 | 25 | 19 | 17 | 3.9 | 98.0 | 45 | 11 |
| 18 | 20 | 13 | 13 | 26 | 18 | 8 | 4.2 | 99.0 | 46 | 11 |
| 19 | 15 | 11 | 6 | 16 | 11 | 11 | 6.2 | 92.0 | 58 | 24 |
| 20 | 14 | 10 | 6 | 17 | 10 | 10 | 6.5 | 92.0 | 58 | 23 |
| 21 | 15 | 11 | 9 | 18 | 11 | 10 | 7.0 | 92.5 | 61 | 26 |
| 22 | 14 | 8 | 6 | 19 | 12 | 11 | 5.7 | 92.5 | 56 | 23 |
| 23 | 13 | 8 | 5 | 19 | 14 | 11 | 5.1 | 93.0 | 57 | 21 |
| 24 | 12 | 9 | 5 | 18 | 11 | 9 | 7.2 | 94.5 | 56 | 19 |
| 25 | 12 | 9 | 4 | 17 | 11 | 8 | 9.4 | 95.0 | 60 | 25 |
| 26 | 13 | 8 | 4 | 17 | 10 | 6 | 10.6 | 94.5 | 58 | 25 |
| 27 | 15 | 11 | 9 | 18 | 13 | 11 | 8.0 | 93.0 | 49 | 16 |
| 28 | 14 | 10 | 8 | 18 | 12 | 9 | 7.1 | 92.5 | 60 | 26 |
| 29 | 14 | 11 | 7 | 17 | 12 | 10 | 8.2 | 92.5 | 59 | 24 |
| 30 | 15 | 11 | 9 | 20 | 15 | 11 | 4.1 | 89.0 | 54 | 23 |
| 31 | 12 | 8 | 6 | 14 | 10 | 8 | 6.2 | 92.0 | 57 | 25 |
| 32 | 10 | 8 | 5 | 13 | 10 | 6 | 6.5 | 91.5 | 57 | 25 |
| 33 | 10 | 7 | 4 | 13 | 9 | 5 | 6.0 | 91.5 | 56 | 26 |
| 34 | 9 | 6 | 4 | 12 | 9 | 5 | 7.0 | 91.5 | 55 | 24 |
| 35 | 15 | 10 | 8 | 18 | 14 | 11 | 5.3 | 97.0 | 58 | 23 |
| 36 | 15 | 11 | 8 | 19 | 14 | 10 | 5.7 | 97.5 | 59 | 23 |
| 37 | 20 | 11 | 8 | 26 | 21 | 16 | 8.0 | 92.5 | 51 | 13 |
| 38 | 21 | 11 | 9 | 27 | 23 | 17 | 8.4 | 93.0 | 51 | 13 |
| 39 | 21 | 12 | 9 | 28 | 22 | 17 | 8.1 | 93.0 | 52 | 13 |
| 40 | 20 | 10 | 8 | 26 | 22 | 15 | 9.2 | 93.5 | 53 | 11 |
| 41 | 22 | 9 | 5 | 27 | 23 | 14 | 10.1 | 94.0 | 54 | 15 |
| 42 | 20 | 11 | 8 | 26 | 23 | 12 | 12.7 | 96.0 | 51 | 12 |
| 43 | 18 | 10 | 7 | 24 | 22 | 10 | 13.9 | 96.0 | 52 | 12 |
| 44 | 19 | 11 | 5 | 25 | 21 | 14 | 16.0 | 96.5 | 54 | 13 |

TABLE 4-continued

| | | | | | | | | | | |
|---|---|---|---|---|---|---|---|---|---|---|
| 45 | 21 | 13 | 9 | 27 | 23 | 16 | 8.9 | 93.5 | 45 | 9 |
| 46 | 21 | 12 | 9 | 28 | 21 | 16 | 8.3 | 93.0 | 52 | 13 |
| 47 | 20 | 11 | 8 | 27 | 22 | 17 | 8.0 | 92.5 | 52 | 12 |
| 48 | 23 | 14 | 9 | 30 | 24 | 16 | 5.1 | 88.0 | 54 | 11 |
| 49 | 18 | 9 | 7 | 23 | 17 | 12 | 7.8 | 92.0 | 52 | 12 |
| 50 | 16 | 9 | 6 | 22 | 14 | 11 | 8.3 | 91.5 | 52 | 12 |
| 51 | 15 | 8 | 6 | 22 | 14 | 11 | 8.1 | 92.0 | 51 | 10 |
| 52 | 15 | 7 | 5 | 21 | 13 | 10 | 9.2 | 91.0 | 52 | 10 |
| 53 | 20 | 10 | 8 | 27 | 22 | 14 | 8.0 | 99.0 | 53 | 12 |
| 54 | 21 | 10 | 9 | 26 | 23 | 15 | 8.5 | 100.0 | 52 | 12 |
| 55 | 19 | 10 | 8 | 25 | 20 | 15 | 8.0 | 92.0 | 48 | 10 |
| 56 | 19 | 11 | 8 | 26 | 22 | 17 | 7.7 | 92.0 | 49 | 10 |
| 57 | 20 | 11 | 9 | 27 | 21 | 16 | 8.6 | 92.0 | 49 | 11 |
| 58 | 20 | 11 | 8 | 27 | 24 | 16 | 9.8 | 92.5 | 50 | 11 |
| 59 | 21 | 9 | 6 | 27 | 22 | 14 | 10.4 | 93.0 | 50 | 14 |
| 60 | 20 | 9 | 9 | 26 | 23 | 15 | 11.1 | 94.0 | 49 | 9 |
| 61 | 19 | 10 | 7 | 26 | 21 | 14 | 11.9 | 94.5 | 49 | 11 |
| 62 | 18 | 9 | 6 | 25 | 20 | 14 | 12.5 | 94.0 | 50 | 10 |
| 63 | 21 | 11 | 9 | 27 | 23 | 16 | 18.5 | 92.5 | 43 | 7 |
| 64 | 20 | 11 | 8 | 26 | 22 | 16 | 8.7 | 92.5 | 49 | 11 |
| 65 | 21 | 10 | 8 | 26 | 21 | 16 | 8.3 | 91.5 | 49 | 11 |
| 66 | 22 | 13 | 10 | 29 | 23 | 18 | 6.0 | 88.5 | 51 | 9 |
| 67 | 18 | 8 | 6 | 20 | 16 | 11 | 7.7 | 92.0 | 50 | 10 |
| 68 | 16 | 7 | 6 | 19 | 15 | 10 | 8.2 | 91.5 | 49 | 10 |
| 69 | 15 | 7 | 5 | 17 | 14 | 10 | 7.9 | 91.0 | 49 | 9 |
| 70 | 13 | 6 | 4 | 16 | 14 | 8 | 7.6 | 91.0 | 48 | 8 |
| 71 | 20 | 11 | 9 | 26 | 23 | 16 | 9.0 | 100.0 | 50 | 11 |
| 72 | 19 | 10 | 8 | 26 | 22 | 14 | 9.2 | 100.5 | 49 | 11 |
| Comparative experiment | | | | | | | | | | |
| 1 | 13 | 8 | 4 | 10 | 8 | 4 | 2.4 | 89.0 | 28 | 5 |
| 2 | 7 | 4 | 2 | 6 | 4 | 2 | 4.2 | 90.0 | 34 | 10 |
| 3 | 12 | 4 | 1 | 13 | 7 | 3 | 4.1 | 89.5 | 27 | 4 |
| 4 | 11 | 3 | 1 | 9 | 7 | 2 | 2.7 | 88.5 | 23 | 3 |

We claim:
1. A molding material which essentially contains
(A) a copolymer, constituting a hard phase, which contains, as copolymerized units,
(a₁) one or more vinyl-aromatic monomers in amounts of from 80 to 60% by weight and
(a₂) one or more ethylenically unsaturated monomers in amounts of from 40 to 20% by weight,
(B) a graft copolymer which contains
(ba) a hard phase and
(bb) an elastomer phase with a number-average particle diameter of from 0.5 to 5 μm, the graft copolymer B containing, as copolymerized units,
(bc) one or more vinyl-aromatic monomers,
(bd) one or more ethylenically unsaturated monomers which make up the hard phase ba and
(be) one or more aliphatic diene monomers, the graft copolymer having been prepared by polymerizing 100 parts by weight of a mixture of the monomers (bc+bd) which form a hard polymer in the presence of from 10 to 20 parts by weight of an elastomeric polymer or copolymer as the grafting base, the said grafting base being dissolved in the monomers (bc+bd), with or without addition of an inert organic solvent, and the said base having been synthesized from the monomers (be), (be)+(bc), or (be)+(bd), where 20 to 50% by weight of the total amount of the monomers (bc+bd) forming a hard polymer have been grafted onto the grafting base and
(C) a graft copolymer which consists of
(ca) a hard phase grafted onto
(cb) an elastomer phase as the grafting base, the latter essentially containing particles of two different sizes with mean number-average diameters,
(cb₁) from 0.05 to 0.18 μm, and
(cb₂) from 0.25 to 0.6 μm, the graft copolymer C containing, as polymerized units,
(cc) one or more vinyl-aromatic monomers,
(cd) one or more ethylenically unsaturated monomers, cc and cd forming said hard phase ca, and
(ce) one or more aliphatic diene monomers, one or more alkyl acrylates with alkyl of 2 to 8 carbon atoms or mixtures of said diene and said alkyl acrylates, the graft copolymer C having been prepared by grafting, in aqueous emulsion, the monomers (cc and cd) forming a hard phase onto a polymer of the monomers (ce), which form an elastomer phase and act as the grafting base, the proportion of (cc) and (cd) being from 20 to 60% by weight, based on the sum of (cc), (cd) and (ce), optionally plus
(D) effective amounts of fillers, pigments, stabilizers, lubricants and slip agents, wherein the copolymer A constitutes from 5 to 80% by weight, and the graft copolymers B+C together constitute from 20 to 95% by weight of the molding material of the sum of A+B+C, and where the proportion of the elastomer phase (cb₁) of the graft copolymer C is less than 60% by weight of the sum of the elastomer phases (cb₁), (cb₂) and (bb), and the weight ratio of the elastomer phases (cb₁) to (cb₂) is from 80:20 to 20:80.

2. A molding material which essentially contains
(A) a copolymer, constituting a hard phase, which contains, as copolymerized units,
(a₁) one or more vinyl-aromatic monomers in amounts of from 80 to 45% by weight and
(a₂) an alkyl methacrylate in amounts of from 55 to 20% by weight,
(B) a graft copolymer which contains
(ba) a hard phase and
(bb) an elastomer phase with a number-average particle diameter of from 0.5 to 5 μm, the graft copolymer B containing, as copolymerized units,
(bc) one or more vinyl-aromatic monomers, (bd) one or more other ethylenically unsaturated monomers, bc and bd forming said hard phase ba, and (be) one or more aliphatic diene monomers, the graft copolymer having been prepared by polymerizing 100 parts by weight of a mixture of the monomers (bc+bd) which form a hard polymer in the presence of from 10 to 20 parts by weight of an elastomeric polymer or copolymer as the grafting base, the said grafting base being dissolved in the monomers (bc+bd), with or without addition of an inert organic solvent, and the said base having been synthesized from the monomers (be), (be)+(bc) or (be)+(bd), and 20 to 50% by weight of the total amount of the monomers (bc+bd) forming a hard polymer having been grafted onto the grafting base, and (C) a graft copolymer which consists of (ca) a hard phase as the grafting grains and (cb) an elastomer phase as the grafting base, the latter essentially containing particles of two different mean number-average diameters, ($cb_1$) from 0.05 to 0.18 $\mu$m, and ($cb_2$) from 0.25 to 0.6 $\mu$m, the graft copolymer C containing, as polymerized units, (cc) one or more vinyl-aromatic monomers, (cd) one or more other ethylenically unsaturated monomers, cc and cd forming said hard phase ca, and (ce) one or more aliphatic diene monomers, one or more alkyl acrylates of 2 to 8 carbon atoms or mixtures of the said diene and said alkyl acrylates, and the graft copolymer C having been prepared by grafting, in aqueous emulsion, the monomers (cc and cd) which from the hard phase onto a polymer of the monomer (ce), which forms the elastomer phase and acts as the grafting base, the proportion of (cc) and (cd) being from 20 to 60% by weight, based on the sum of (cc), (cd) and (ce), optionally plus (D) effective amounts of fillers, pigments, stabilizers, lubricants and slip agents, wherein the copolymer A constitutes from 5 to 80% by weight, and the graft copolymers B+C together constitute from 20 to 95% by weight of the molding material, of the sum of A+B+C, and the proportion of the elastomer phase ($cb_1$) of the graft copolymer C is less than 60% by weight, of the sum of the elastomer phases ($cb_1$), ($cb_2$) and (bb), and the weight ratio of the elastomer phases ($cb_1$) to ($cb_2$) is from 80:20 to 20:80.

3. A molding material as set forth in claim 1 or 2, wherein the monomer mixture is polymerized in the presence of a polymer of the monomer (be), which copolymer has been dissolved in the monomer mixture.

4. A molding material as set forth in claim 1 or 2, wherein the monomer mixture is grafted onto a copolymer which is synthesized from not less than 50% by weight of monomer (be) and from up to 50% by weight of monomer (bc).

5. A molding material as set forth in claim 1 or 2, wherein the number-average particle diameter of the elastomer phase (bb) is from 0.9 to 2.1 $\mu$m.

6. A molding material as set forth in claim 1 wherein the mean number-average diameters of ($cb_1$) is from 0.08 to 0.15 $\mu$m and of ($cb_2$) is from 0.35 to 0.50 $\mu$m.

7. A molding material as defined in claim 6 wherein the proportion of the elastomer phase ($cb_1$) of the graph copolymer C is less than 30% by weight of the sum of the elastomer phases ($cb_1$), ($cb_2$) and (bb).

8. A molding material as defined in claim 2 wherein the mean number-average diameters of ($cb_1$) is from 0.08 to 0.15 $\mu$m and of ($cb_2$) is from 0.35 to 0.50 $\mu$m.

9. A molding material as defined in claim 8 wherein the proportion of the elastomer phase ($cb_1$) of the graph copolymer C is less than 30% by weight of the sum of the elastomer phases ($cb_1$), ($cb_2$) and bb.

* * * * *